(12) United States Patent
Winograd et al.

(10) Patent No.: US 11,865,883 B2
(45) Date of Patent: Jan. 9, 2024

(54) SYSTEM AND METHOD FOR SECURING AN ASSET

(71) Applicant: Phillips Connect Technologies, LLC, Santa Fe Springs, CA (US)

(72) Inventors: Gil Winograd, Aliso Viejo, CA (US); Jim Epler, Irvine, CA (US); Adam Bean, Hacienda Heights, CA (US); Thomas Peterson, Glendora, CA (US); Zhimin Guo, Brea, CA (US)

(73) Assignee: Phillips Connect Technologies, LLC, Santa Fe Springs, CA (US)

( * ) Notice: Subject to any disclaimer, the term of this patent is extended or adjusted under 35 U.S.C. 154(b) by 301 days.

(21) Appl. No.: 16/862,418

(22) Filed: Apr. 29, 2020

(65) Prior Publication Data

US 2020/0338942 A1 Oct. 29, 2020

Related U.S. Application Data

(60) Provisional application No. 62/980,022, filed on Feb. 21, 2020, provisional application No. 62/840,389, filed on Apr. 29, 2019.

(51) Int. Cl.
*B60D 1/64* (2006.01)

(52) U.S. Cl.
CPC .................... *B60D 1/64* (2013.01)

(58) Field of Classification Search
CPC .. B60D 1/62; B60D 1/64; B60T 17/04; B60T 17/043; B60T 17/046
See application file for complete search history.

(56) References Cited

U.S. PATENT DOCUMENTS

| | | | | |
|---|---|---|---|---|
| 521,122 A | * | 6/1894 | Martin | B60T 17/043 285/317 |
| 816,029 A | * | 3/1906 | McElroy | F16L 37/122 285/76 |
| 1,249,074 A | * | 12/1917 | Haldeman | F16L 37/256 285/69 |
| 2,535,740 A | * | 12/1950 | Knopp | B60T 17/043 251/89.5 |
| 2,684,860 A | * | 7/1954 | Rafferty | F16L 37/248 285/376 |
| 3,079,122 A | * | 2/1963 | Schneider | F16L 37/256 251/89.5 |
| 3,892,431 A | * | 7/1975 | Booth | B60T 17/043 285/79 |
| 4,125,279 A | * | 11/1978 | Scott | B61G 5/08 285/88 |
| 4,253,680 A | * | 3/1981 | Albright | B60D 1/36 280/475 |

(Continued)

FOREIGN PATENT DOCUMENTS

EP 2949490 B1 11/2018

*Primary Examiner* — Tony H Winner
*Assistant Examiner* — Maurice L Williams
(74) *Attorney, Agent, or Firm* — Haynes and Boone, LLP

(57) ABSTRACT

A system and method is provided to lock or unlock a gladhand coupler on a towed asset to prevent connection of a tractor air line to the gladhand is provided. The system prevents the tractor from properly operating the towed asset brakes and therefore prevents the unauthorized movement of the towed asset. The system has a locking mechanism that blocks the surface on the gladhand used for coupling with another gladhand coupler.

7 Claims, 15 Drawing Sheets

(56) References Cited

U.S. PATENT DOCUMENTS

| | | | | |
|---|---|---|---|---|
| 4,852,915 | A | 8/1989 | Campanini | |
| 5,072,913 | A * | 12/1991 | Carroll | B60T 17/043 267/155 |
| 5,129,243 | A * | 7/1992 | Kassebaum | F16L 37/256 70/237 |
| 5,251,666 | A * | 10/1993 | Kimball | B60T 17/043 285/317 |
| 5,410,894 | A * | 5/1995 | Fox | B60R 25/08 70/237 |
| 5,580,076 | A * | 12/1996 | DeRoule | B60D 1/62 280/491.5 |
| 5,675,997 | A * | 10/1997 | Hulak | B60R 25/00 70/164 |
| 5,677,667 | A * | 10/1997 | Lesesky | B60T 17/043 439/35 |
| 5,865,329 | A * | 2/1999 | Gay | B61G 5/08 213/1.3 |
| 5,911,444 | A * | 6/1999 | Buchter | B60T 17/043 285/83 |
| 6,102,443 | A * | 8/2000 | Lang, Jr. | F16L 37/256 285/67 |
| 6,120,064 | A * | 9/2000 | McNamara | F16L 37/256 285/38 |
| 6,253,890 | B1 * | 7/2001 | Hunter | F16D 65/22 188/325 |
| 6,325,355 | B1 * | 12/2001 | Johnson | F16K 35/04 251/243 |
| 6,402,261 | B1 | 6/2002 | Barnett et al. | |
| 6,669,237 | B1 * | 12/2003 | Burch | F16L 37/256 285/87 |
| 6,749,438 | B1 * | 6/2004 | Scheller | H01R 27/02 439/639 |
| 7,401,801 | B2 | 7/2008 | Halverson et al. | |
| 7,461,869 | B2 * | 12/2008 | Sommerfeld | B60D 1/62 285/63 |
| 7,552,606 | B2 * | 6/2009 | Drummond | B65G 69/003 70/237 |
| 7,594,816 | B1 * | 9/2009 | Wang | H01R 31/00 439/35 |
| 7,696,862 | B2 * | 4/2010 | Herschell | B60T 7/18 340/8.1 |
| 7,922,085 | B2 * | 4/2011 | Thomas | G06Q 10/08 235/492 |
| 8,052,172 | B1 * | 11/2011 | Junior | B61G 5/08 292/195 |
| 8,398,120 | B2 | 3/2013 | Puluc et al. | |
| 8,499,797 | B1 * | 8/2013 | Caine | B60T 17/043 138/34 |
| 9,716,968 | B2 | 7/2017 | Mansuri et al. | |
| 9,796,358 | B2 * | 10/2017 | Allingham | B60R 25/044 |
| 9,805,234 | B1 * | 10/2017 | Baum | G06K 7/10217 |
| 10,093,327 | B2 * | 10/2018 | Aiken | B60D 1/64 |
| 10,920,917 | B2 * | 2/2021 | Sell | B60T 17/002 |
| 10,926,752 | B2 * | 2/2021 | Papafagos | F16L 37/256 |
| 11,068,837 | B2 * | 7/2021 | Murray | G06V 40/10 |
| 11,094,149 | B2 * | 8/2021 | Fujiwara | G07C 9/00174 |
| 2005/0062590 | A1 * | 3/2005 | Lang | B60D 1/62 340/431 |
| 2008/0303648 | A1 * | 12/2008 | Day | B60D 1/62 340/431 |
| 2012/0025487 | A1 * | 2/2012 | Kneer | B60T 17/043 280/420 |
| 2013/0342343 | A1 * | 12/2013 | Harring | H04L 63/102 340/521 |
| 2018/0099712 | A1 | 4/2018 | Bean et al. | |
| 2018/0247262 | A1 * | 8/2018 | Arena | H04W 4/02 |
| 2018/0308045 | A1 * | 10/2018 | Arena | G07C 9/00896 |
| 2019/0232738 | A1 | 8/2019 | Furuno et al. | |
| 2019/0302764 | A1 * | 10/2019 | Smith | B65G 69/2882 |
| 2020/0346706 | A1 * | 11/2020 | Isenschmid | G08G 1/166 |

\* cited by examiner

SYSTEM AND METHOD FOR SECURING AN ASSET

CROSS-REFERENCE TO RELATED APPLICATION(S)

This application claims benefit of U.S. Provisional Application No. 62/840,389, filed on Apr. 29, 2019, and U.S. provisional Application No. 62/980,022, filed on Feb. 21, 2020, the disclosures of which are incorporated herein by reference in their entireties.

FIELD OF THE INVENTION

The present invention relates to the field of pneumatic system and more particularly to locking mechanism used in the pneumatic system.

BACKGROUND

The modern-day commercial transport system utilizes trailers as a mode of transport for transporting heavy commercial goods. The transport system generally has a tractor unit which is coupled in series to a towed asset, where the towed asset can be a trailer or chassis or flatbed or specialty trailers. Since tractors and the towed asset need to be coupled and decoupled from time to time, the pneumatic lines are equipped with coupling devices called gladhands that facilitates quick connection/disconnection between the pneumatic lines present on the tractor unit and the towed asset. The pneumatic lines play an important part in the brake system.

The gladhand is an interlocking hose coupling fitted to hoses supplying pressurized air from the tractor the towed asset for regulating pneumatically operated brakes. One half of a gladhand is fitted to a hose connected to the air compressor of the tractor which supplies pressurized air, while the other half which is often fixedly coupled to the front of a towed asset to provide the pressurized air from the tractor to air brakes on the towed asset. The gladhands are designed to allow the driver to manually disconnect hoses between the tractor and the towed asset. Typically, gladhands are color coded with service brake lines being blue and emergency brake lines being red. When the red/emergency line is prevented from being pressurized, the operator is prevented from releasing the emergency brakes, thus preventing the motion of the towed asset outright. When the blue/service line is prevented from being pressurized, it effectively prevents the operator from applying the service brakes, which makes the towed asset unsuitable for towing at high speeds on surface streets or highways. The gladhand couplers are typically standardized in size and mating geometry, which allows them to be connected to each other, for example allowing one trucking company's tractor unit to be connected to any number of freight towed assets.

The towed assets are used in various applications like transport of consumer goods, food products etc. In many cases, while connecting a tractor to a towed asset, the driver accidently connects the tractor to an incorrect towed asset and carries away the wrong asset unintentionally. Therefore, a system is required that provides a proper authentication of a tractor and its counterpart towed asset before allowing them to be connected.

Further challenges relate to intermodal operations, where yard trucks are used to ferry containers between various transportation modalities. More particularly, intermodal freight transport for the transportation of freight in an intermodal container or asset uses multiple modes of transportation (like: rail, ship, and truck) without handling of the freight itself when changing the modes. It reduces cargo handling, improves security, reduces damage and loss and allows freight to be transported faster. Therefore, a system is required for the transportation of freight in an intermodal container or asset using multiple modes of transportation.

Moreover, an unauthorized taking of a cargo in the container is facilitated by the fact that an unauthorized tractor can be backed up and hitched to any towed asset. Without proper monitoring by a supervisor, the gladhand couplers can be coupled with any towed assets, thereby supplying air pressure to release the emergency brakes. Thus, unauthorized persons may surreptitiously haul away an unattended towed asset.

A wide range of solutions have been proposed over the years to automate one or more of the above processes, and to reduce the labor needed by the driver. However, the freight industry still relies upon the above-described manual approaches to connect and disconnect a towed asset to/from a truck tractor. Consequently, there exists a need for a mechanism that prevent unauthorized coupling between gladhand connectors on the tractor unit and the towed asset.

In order to overcome the aforementioned problems, the present invention provides a system and a method that prevents unauthorized coupling between the gladhand connectors on tractor and the towed asset.

SUMMARY

In a first aspect of the present invention, a locking gladhand device is provided. The locking gladhand device comprises: a body; a connector plate coupled to and offset from a surface of the body, the connector plate and the body defining a gap therebetween; and a locking device coupled to the connector plate and comprising a moveable protrusion connected to an actuator, and a microcontroller to signal the actuator to extend the moveable protrusion into the gap between the body and the connector plate in a locked state, and to retract from the gap in an unlocked state. The locking device is configured to prevent a mating tractor gladhand coupler from mating with the locking gladhand device when in the locked state, and to allow the mating tractor gladhand coupler to mate with the locking gladhand device when in the unlocked state. The connector plate has an opening, wherein the moveable protrusion is configured to extend through the opening of the connector plate when the locking device is in the locked state. The locking device is configured to receive electrical power through a wired connection from an electrical system of a trailer or a chassis or a self-contained battery. The locking gladhand device further comprises: a mounting bracket fixedly coupled to surface of a trailer or a chassis. The protrusion is configured to move in a horizontal direction or in a vertical direction. The locking device further comprises: an emergency port to lock or unlock the locking gladhand device by inserting a mechanical tool. The locking device further comprises: a battery; a receiver configured to receive a wireless control signal from a mobile device or a remote server; and a processor configured to control the locking device in a locked state or an unlocked state based on the wireless control signal. The microcontroller may comprise a memory configured to store a digital certificate for verifying an encrypted signature such that the microcontroller rejects a signal with an unmatched digital certificate.

In a second aspect of the present invention, a locking gladhand device is provided. The locking gladhand device:

a mounting bracket; a rotatable body rotatably coupled to the mounting bracket via a rotator at an axis of rotation; and a locking device comprising a moveable protrusion connected to an actuator, and a microcontroller to signal the actuator to extend the moveable protrusion to engage the rotatable body in a locked state to lock a relative position of the rotatable body and the mounting bracket in a closed position, and to disengage the rotatable body in an unlocked state. The actuator can be a solenoid or a motor. The locking device is configured to prevent a mating tractor gladhand coupler from mating with the locking gladhand device when in the locked state, and to allow the mating tractor gladhand coupler to mate with the locking gladhand device when in the unlocked state. The mounting bracket has a stopper portion, and the locking gladhand device may further comprise a spring element coupled to the mounting bracket and the rotatable body and configured to bias the rotatable body toward the stopper portion of the mounting bracket. The moveable protrusion is configured to move in a horizontal direction or in a vertical direction to lock the rotatable body. The locking device may further comprise an emergency port to lock or unlock the locking gladhand device by inserting a mechanical tool. The locking device may further comprise: a battery; a receiver configured to receive a wireless control signal from a mobile device or a remote server; and a processor configured to control the locking device into an locked state or an unlocked state based on the wireless control signal. The microcontroller may comprise a memory configured to store a digital certificate for verifying an encrypted signature such that the microcontroller rejects a signal with an unmatched digital certificate.

BRIEF DESCRIPTION OF DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown enlarged in the drawings to facilitate an understanding of different features. In the drawings.

DETAILED DESCRIPTION

Figure 1A:
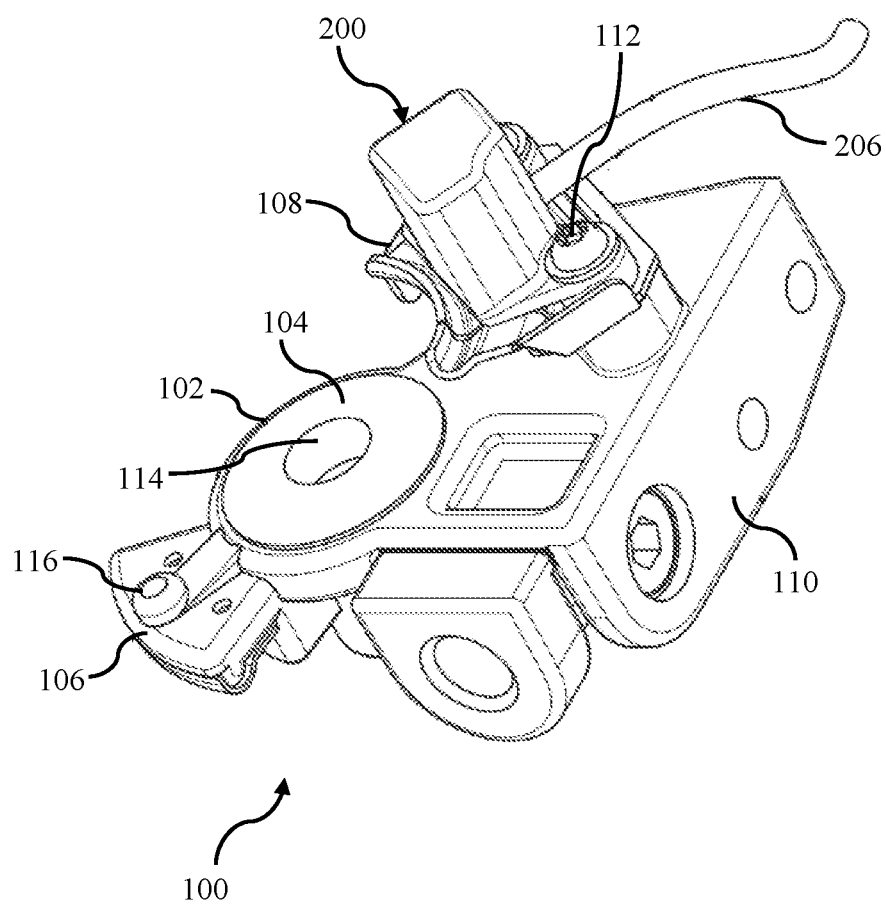
FIG. 1A and FIG. 1B illustrate a perspective views of a fixed locking gladhand device in accordance with some embodiments of the present invention.

In the following detailed description of embodiments of the invention, numerous specific details are set forth in order to provide a thorough understanding of the embodiment of the invention. However, it will be obvious to a person skilled in the art that the embodiments of the invention may be practiced with or without these specific details. In other instances well known methods, procedures and components have not been described in detail, so as not to unnecessarily obscure aspects of the embodiments of the invention.

The terminology used herein is for the purpose of describing particular embodiments only and is not intended to be limiting of the invention. As used herein, the term "and/or" includes any and all combinations of one or more of the associated listed items. As used herein, the singular forms "a", "an", and "the" are intended to include the plural forms as well as the singular forms, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Before describing the invention in greater detail, it would be useful to define some of the common terms used herein when describing various embodiments of the invention.

The term "towed asset: includes, but is not limited to a trailer, chassis, a flatbed, and all types of transportation units moveable on wheels and having provisions of pneumatic lines for performing emergency brake and/or service brake operations.

The embodiments of the present invention provide a locking mechanism that can be controlled remotely and prevents the connection of one of the pneumatic lines from the tractor onto the towed asset, thereby disabling the operation of the braking system on the trailer and preventing unauthorized movement of the towed asset. In a straight gladhand, the locking mechanism prevents the connection by blocking the mating surface between the gladhand connectors. In swinging gladhands, the locking mechanism locks the swinging gladhand against the trailer or chassis such that an operator cannot rotate the gladhand into the open position. The locking mechanism comprises a housing having a moveable locking pin arranged to travel either in the vertical direction, horizontal direction or at an angle. The locking device can be fixed on different surfaces of a gladhand using fasteners or screws. The positioning of the locking device on the gladhand depends on the type of gladhand device and direction of movement of the locking pin. The locking pin when retracted allows the mating of gladhand connectors. When the locking pin is extended over the surface of the gladhand device, it either restrains the gladhand device component's movement or it blocks the surface on the gladhand that is required for connecting it to another connector. The movement of the locking pin in the locking device can be performed through a motor, solenoid, or other type of actuator. A master controller provides a wired or wireless control signal to extend/retract the locking pin to lock/unlock the gladhand. The locking device can be remotely controlled by a remote server or through an app installed on a mobile device (such as a cellphone or tablet).

Figure 1B:
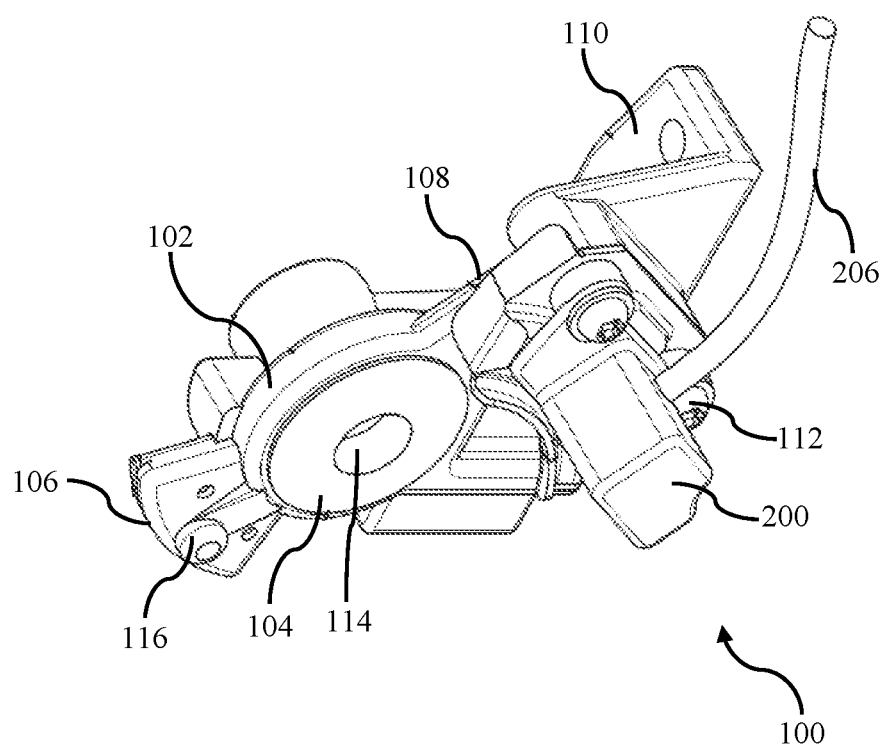
Figure 1C:
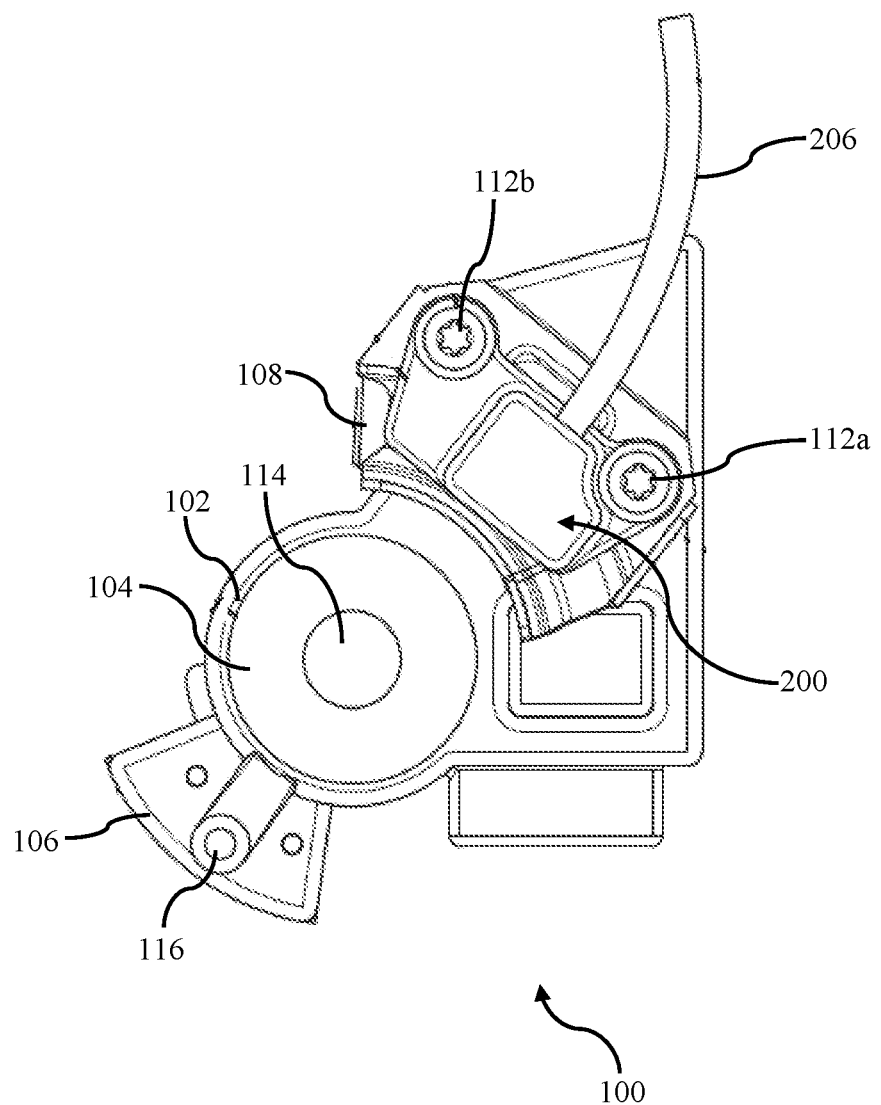
FIGS. 1C and 1D illustrate the top view and front view of the fixed locking gladhand device in accordance with some embodiment of the present invention.
Figure 1D:
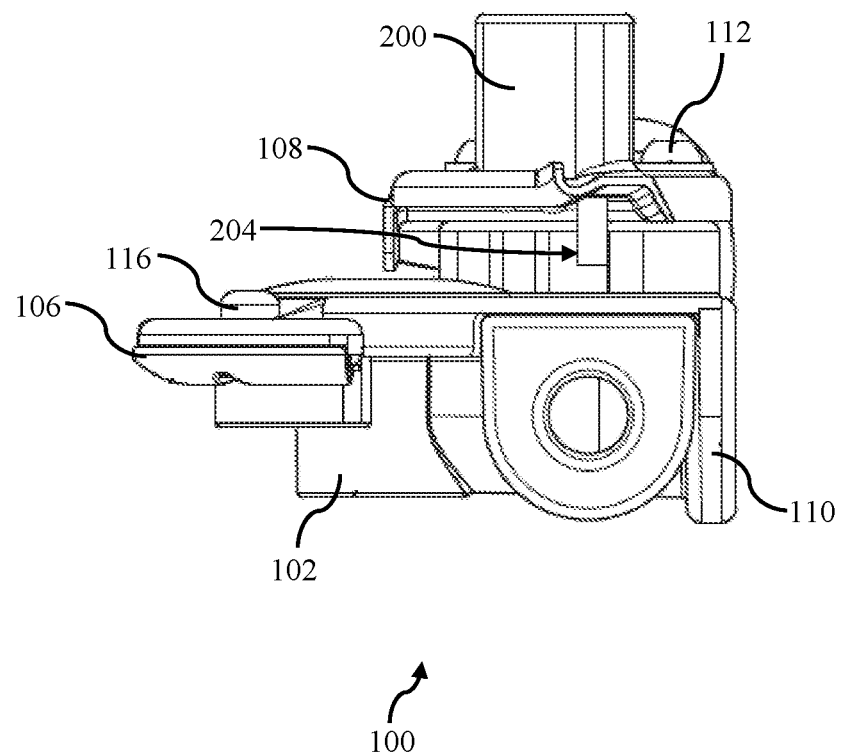

FIG. 1A and FIG. 1B illustrate a perspective view of a fixed locking gladhand device in accordance with some embodiments of the present invention. FIGS. 1C and 1D illustrate a top view and front view of the fixed locking gladhand device in accordance with some embodiment of the present invention. Referring to FIGS. 1A and 1B, the fixed locking gladhand 100 comprises a coupler 102 for mating with the other coupler (or gladhand coupler) carried on a tractor for delivery of pressurized air to release/engage the brakes of the trailer for movement thereof, an arcuate flange 106 with inter-locking groove 116, a locking mechanism 200 configured to allow/prevent the fixed locking gladhand 100 being mated/abutted with the other coupler (or gladhand coupler) on the tractor, the locking mechanism having a wired connection 206 to receive electrical power and/or signal, a base plate 108 for providing a firm base and additional strength to the locking mechanism 200, a mounting bracket 110 for firmly attaching the fixed locking gladhand 100 to the towed asset and a securing means 112 for firmly attaching the housing of locking mechanism 200 to the body of fixed locking gladhand 100 through base plate 108. Preferably, the mounting bracket 110 may be mounted so as to be proximate to the brake air line associated with a given vehicle or towed asset so that an appropriate connection may be made between the air lines and the gladhand assembly.

The coupler 102 comprises an annular resilient seal 104 disposed around the inside of coupler 102 for preventing the leakage of pressurized air while the gladhand couplers (i.e. one coupler at the towed asset and other at the tractor) are mated/abutted, a central port 114 acting as an air passage which may be connected with an air hose leading to a trailer brake actuator. When the two gladhand couplers are connected to one another, they will be connected with their annular resilient seal in abutting contact and with the central ports therein aligned. In this manner, this abutment of gladhand couplers, the seal 104 and central port 114 of both couplers are protected from contamination from dirt, debris, road films and the like. The annular resilient seal 104 is designed to be replaced when necessary. The annular resilient seal 104 is constructed from polyurethane or another durable elastomer.

In a preferred embodiment, the coupler 102 of gladhand(s), as known in the art, is matable with a like member by rotatably engaging the two couplers (i.e. one coupler at the towed asset and other at the tractor) and interlocking the cooperating grooves 116. The locking mechanism 200 facilitates to lock and/or unlock the fixed locking gladhand 100 on a towed asset in such a manner to prevent the unauthorized connection of pneumatic lines of tractor to the fixed locking gladhand 100. The locking gladhand 100 is preferably cast from cast iron or another suitable metal. Preferably the selected metal has good corrosion resistance to the salts used to de-ice roads. The gap/spacing between the base plate 108 and the coupler 102 can accommodate the arcuate flange of a gladhand coupler being mated/abutted, which can rotate into the spacing and form a secure connection with the base plate 108 to lock the two gladhands connectors together.

Referring to FIG. 1C, the housing of the locking mechanism 200 is fitted on the base plate 108 through the secure means 112a, 112b. The base plate 108 provides a firm base and additional strength to the locking mechanism 200 so as to firmly attach the locking mechanism 200 with the body of the gladhand 100 through secure means 112a, 112b. The secure means may be, but not limited to, screw, bolt and the like.

Referring to FIG. 1D, the locking mechanism 200 comprises a movable pin 204 that can extend out of, or retract/retreat into, the housing of the locking mechanism 200 manually or by virtue of the operation of an actuator within the housing. In the locking state of the fixed locking gladhand 100, the movable pin 204 extends out in the space/gap between the base plate 108 and the coupler 102 in order to prevent the unauthorized mating of coupler 102 with the other gladhand coupler attached to the tractor. In the unlocking state of fixed locking gladhand 100, the movable pin 204 retracts/retreats into the housing of the locking mechanism 200 in order to provide the space/gap between the base plate 108 and the coupler 102 that can be accommodated by the arcuate flange of a gladhand coupler being mated/abutted. The actuation of the movable pin 204 may be accomplished manually or automatically.

In one aspect of the present invention, the locking mechanism 200 may provide a mechanical means to an operator to manually extend or retract the movable pin 204, especially for use in case of emergency. The mechanical means may be through a screwdriver that can be inserted into the mechanism and turned to extend or retract the movable pin 204. The mechanism may require a screwdriver head with a less common, unusual, or proprietary shape (such as a torx head) to prevent casual usage of the mechanical override.

In another aspect of the present invention, the locking mechanism 200 may provide the actuation of the movable pin 204 by means of an electronic circuitry, wherein a motor facilitates the movable pin 204 to extend out of, or retract/retreat into, the housing of the locking mechanism 200 in order to lock or unlock the fixed locking gladhand 100.

Figure 2A:
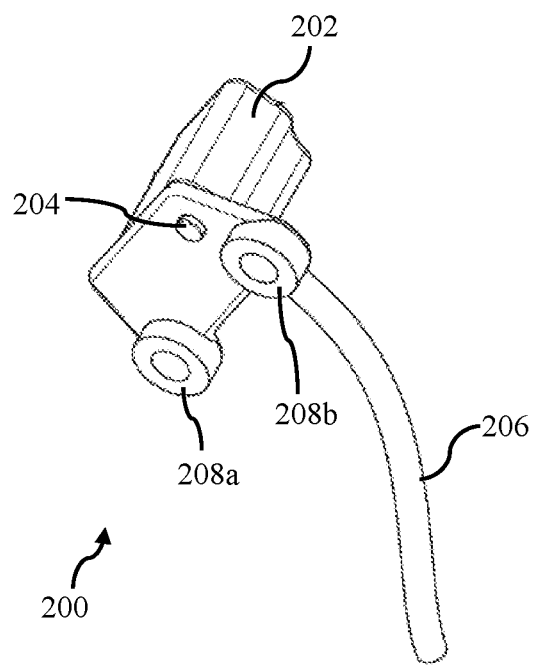
FIGS. 2A and 2B illustrate perspective views of a locking mechanism of the fixed locking gladhand in an unlocked position and locked position, respectively, in accordance with some embodiments of the present invention.
Figure 2B:
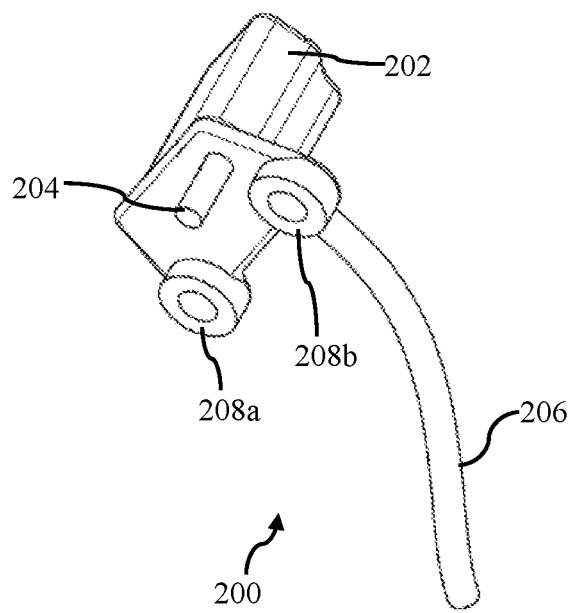

FIG. 2A and 2B illustrate perspective views of a locking mechanism of the fixed locking gladhand in an unlocked position and locked position, respectively, in accordance with some embodiments of the present invention. Referring to FIG. 2A, the locking mechanism 200 comprises a housing 202 enclosing various electrical and mechanical components for providing actuation of movable pin 204, a wired connection 206 to receive electrical power and/or signal and holes 208a, 208b adapted to receive a secure means 112a, 112b (like screw, bolt etc.) for firmly attaching the locking mechanism with the body of the fixed locking gladhand 100. In the unlocking state of the fixed locking gladhand 100, the movable pin 204 retracts/retreats into the closed housing 202 of the locking mechanism 200 (as shown in FIG. 2A) in order to clear the space/gap between the base plate 108 and the coupler 102 that can be accommodated by the arcuate flange of a gladhand coupler being mated/abutted. Once the coupler 102 of the fixed locking gladhand 100 is mated with the gladhand coupler attached to the tractor, pressurized air can flow through the fixed locking gladhand 100 to the pneumatic brakes, thus enabling control of the brakes of the towed asset and enabling it to be towed. The locking mechanism 200 may actuate the movable pin 204 manually or automatically.

In the locking state of the fixed locking gladhand 100, the movable pin 204 extends out (as shown in FIG. 2B) in the space/gap between the base plate 108 and the coupler 102 in order to prevent the unauthorized mating of coupler 102 with the other gladhand coupler attached to the tractor. In the preferred embodiment of the present invention, the locking mechanism 200 may provide the actuation of the movable pin 204 by means of an electronic circuitry, wherein a motor facilitates the movable pin 204 to extend out of, or retract/retreat into, the housing 202 of the locking mechanism 200 in order to lock or unlock the fixed locking gladhand 100. The housing 202 may enclose the movable pin 204, a sensor to detect the position of the gladhand i.e. whether it is closed or open, a motor or solenoid that facilitates the movable locking pin 204 to lock or unlock the gladhand coupler, an electronic circuit that provides the defined motion to the motor or solenoid, a processing unit that can receive commands to lock or unlock the gladhands by engaging or disengaging the movable pin 204, and a wireless communication system to facilitate the fixed locking gladhand 100 to lock/unlock remotely by receiving and transmitting the signals from/to the fleet operator.

Figure 3A:
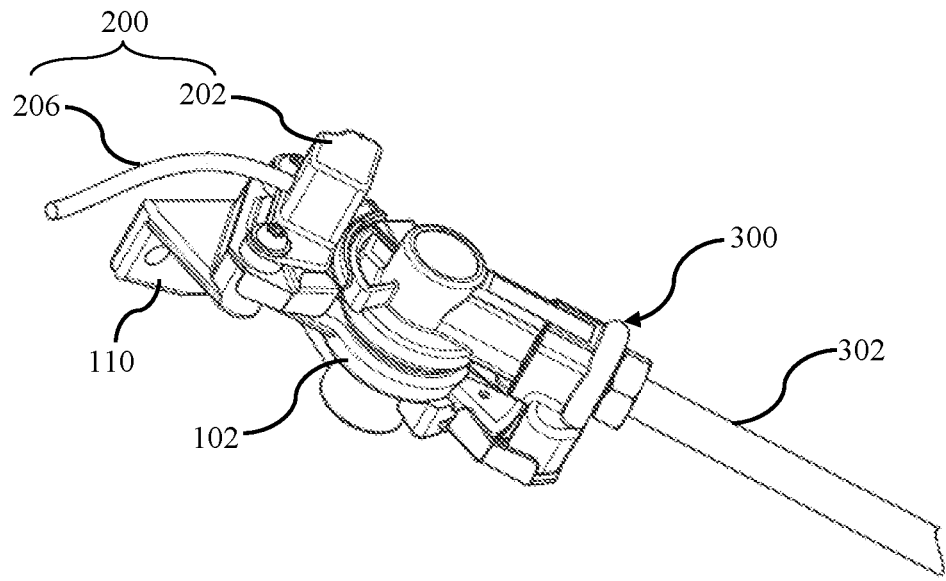
FIG. 3A-3C illustrates different views of the fixed locking gladhand when in an unlocked state/mode and mated with another gladhand connector in accordance with some embodiment of the present invention.
Figure 3B:
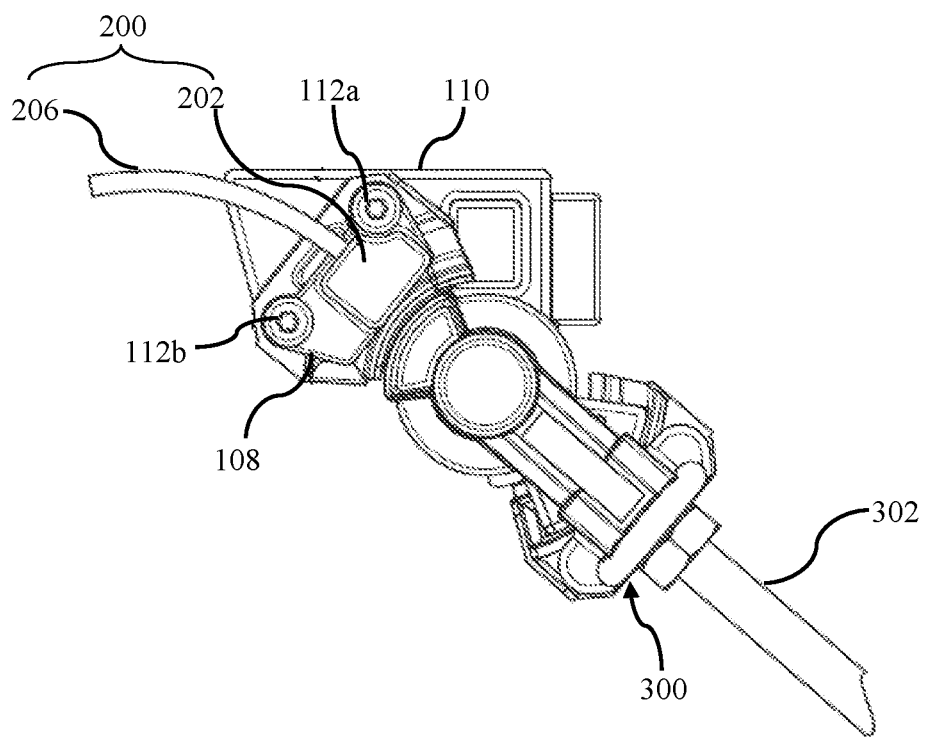
Figure 3C:
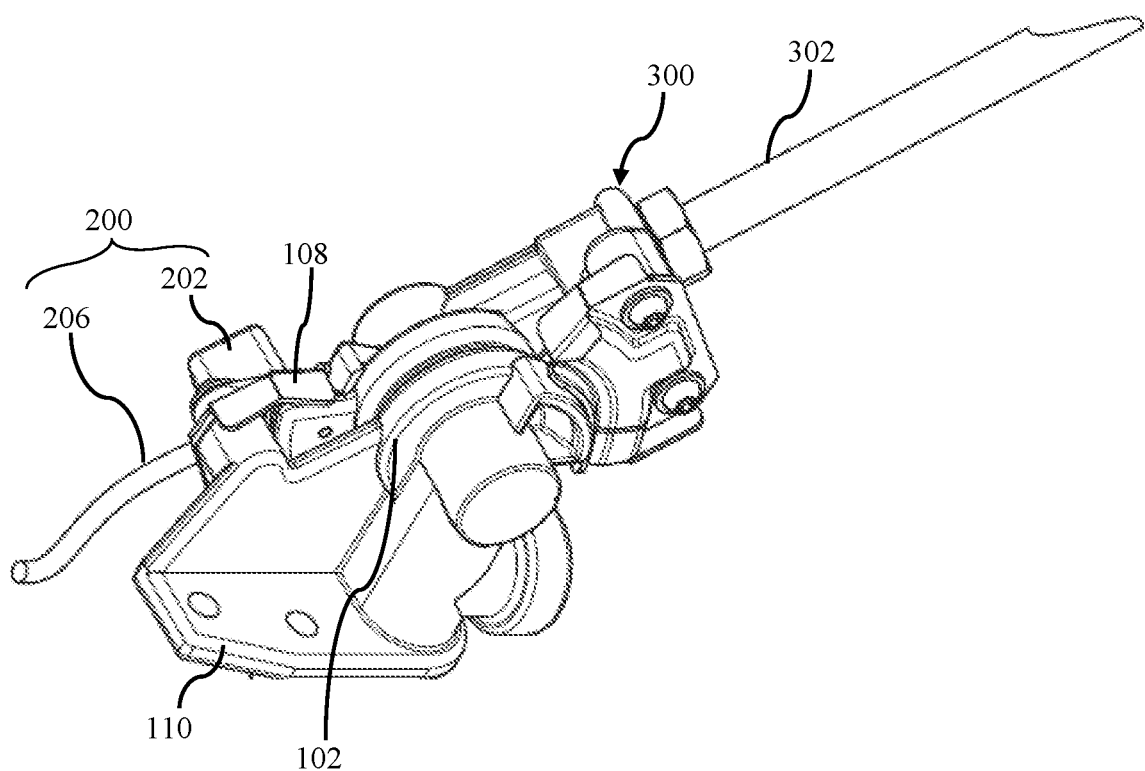

FIG. 3A-3C illustrates different views of the fixed locking gladhand 100 when in an unlocked state/mode and mated with another gladhand connector 300 in accordance with some embodiment of the present invention. Referring to FIG. 3A-3C, the gladhand connector 300 provides a connection of a pneumatic line 302 from a tractor to the fixed locking gladhand 100, so as to provide pressurized air to operate the braking system of the towed asset.

The locking mechanism 200 of the present invention is not limited to a fixed locking gladhand; the locking mechanism 200 may be adapted to an angled gladhand, straight gladhand, swinging gladhand and the like.

Figure 4A:
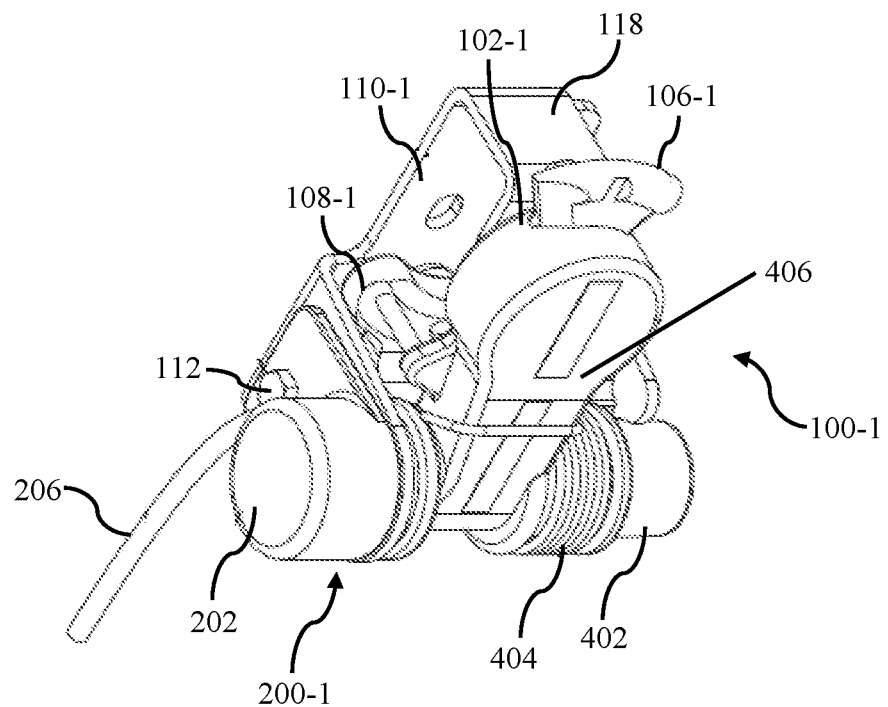
FIG. 4A illustrates a perspective view of the swinging-type locking gladhand in accordance with some embodiments of the present invention.

FIG. 4A illustrates a perspective view of a swinging-type locking gladhand in accordance with some embodiments of the present invention. Referring to FIG. 4A, a swinging-type locking gladhand 100-1 comprises a coupler or interfacing member 102-1 for mating with the other coupler (or gladhand coupler) attached to a tractor for communication of pressurized air to release/engage the brakes of the trailer for movement thereof, an arcuate flange 106-1 with interlockable groove, a locking mechanism 200-1 configured to allow/prevent the swinging-type locking gladhand 100-1 being mated/abutted with the other coupler (or gladhand coupler) attached to a tractor, the locking mechanism having a wired connection 206 to receive electrical power and/or signal, a rotator means 402 for swinging the coupler 102-1 outwardly to accept the mating gladhand coupler attached to a tractor, a spring mechanism 404 for automatically retracting the gladhand coupler 102-1 to move it to its prior and/or locked position, a base plate 108-1 for providing a firm base and additional strength to the locking mechanism 200-1, a mounting bracket 110-1 for firmly attaching the swinging-type locking gladhand 100-1 to the towed asset, a coupler body 406 rotatably coupled to the mounting bracket via a rotator means 402 at an axis of rotation and a securing means 112 for firmly attaching the housing of locking mechanism 200-1 to the body of swinging-type locking gladhand 100-1 through base plate 108-1.

The mounting bracket 110-1 also comprises a stopper arm 118, which at its proximal end extends generally perpendicular from the base of the mounting bracket and at its distal end includes a stopper 118 that generally extends toward the upper and lower extensions so that the stopper arm 118 is parallel to and opposes the base of the mounting bracket. Preferably, the mounting bracket 110-1 may be mounted so as to be proximate to the brake air line associated with a given vehicle or towed asset so that an appropriate connection may be made between the air lines and the gladhand assembly.

The spring mechanism 404 is a coil spring as shown in FIG. 4A. The coil spring may have a first end and a second end, the first end may engage with the coupler of the coupler body and the second end may engage with the coupler support body. The biasing element is preferably pre-loaded.

Figure 4B:
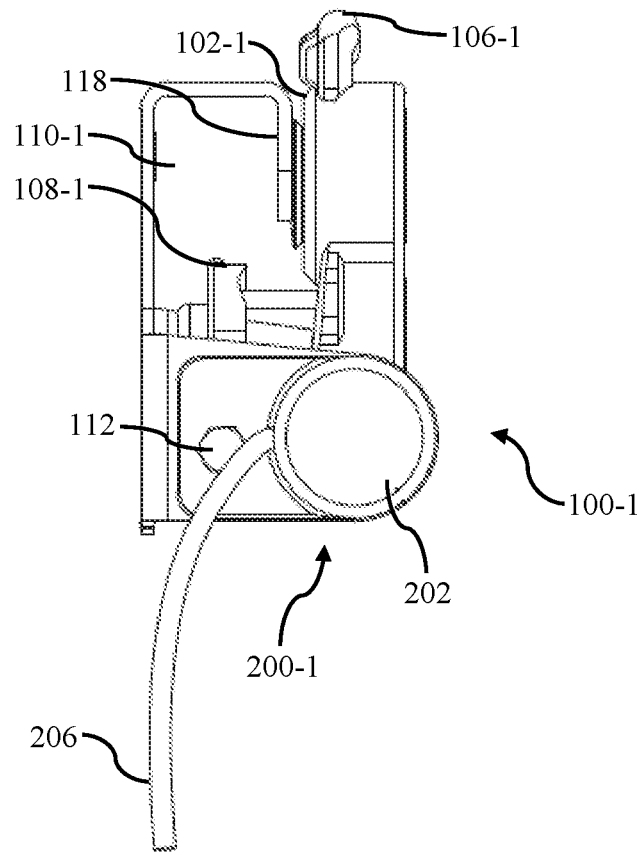
FIG. 4B and FIG. 4C show the top and front views, respectively, of the swinging-type locking gladhand in accordance with some embodiments of the present invention.
Figure 4C:
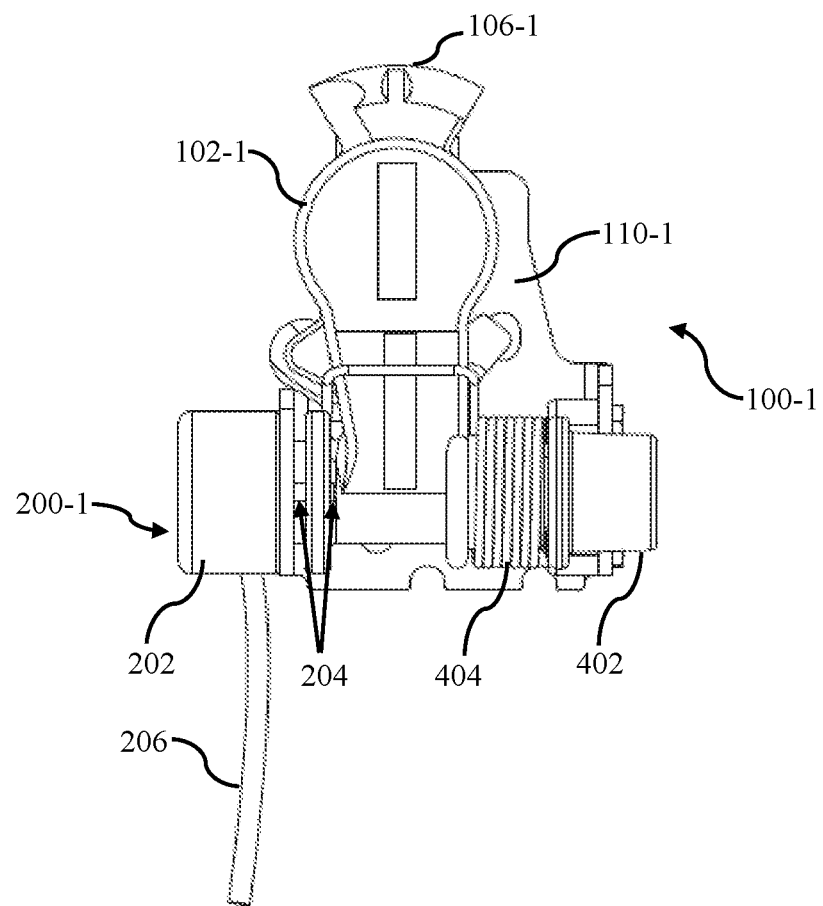

FIG. 4B and FIG. 4C show the top and front views, respectively, of the swinging-type locking gladhand 100-1 in accordance with some embodiments of the present invention. In the preferred embodiment, the locking device 200-1 may be adapted to a swinging-type locking gladhand 100-1. The swinging-type locking gladhand 100-1 has an axis that it rotates on relative to a mounting bracket 110-1, which may be fixedly coupled to the trailer/chassis. The coupler body 406, the arcuate flange 106-1 and the base plate 108-1 may be rotatably coupled to the mounting bracket 110-1 via a rotator means 402 at the axis of rotation. The swinging-type locking gladhand 100-1 is spring-loaded (via the spring mechanism 404), and be biased to a closed position in which the coupler body 406 comes into contact with, or within close proximity to, a stopper arm 118 of the mounting bracket 110-1. Rotating the coupler body 406 away from the stopper arm 118 to an open position may involve a certain amount of exertion to overcome the spring-loaded bias. The stopper arm 118 is positioned to cover the sealed opening of the coupler 102-1 when in the closed position to prevent a mating tractor gladhand coupler from mating with the swinging-type locking gladhand 100-1. The swinging-type locking gladhand 100-1 may further include a base plate coupled to (e.g., fixedly coupled to or attached to) and offset from the coupler body, thus defining a gap therebetween. The gap may accommodate an arcuate flange of a mating tractor gladhand coupler when the swinging-type locking gladhand device 100-1 is in an open state.

In another embodiment of the present invention, the locking mechanism 200-1 may be coupled to (e.g., attached to or fixedly coupled to) the mounting bracket 110-1 (e.g., via one or more screws or securing means 112) and be positioned above the rotator means 402 (e.g., along the rotation axis of the rotator 402).

Figure 4D:
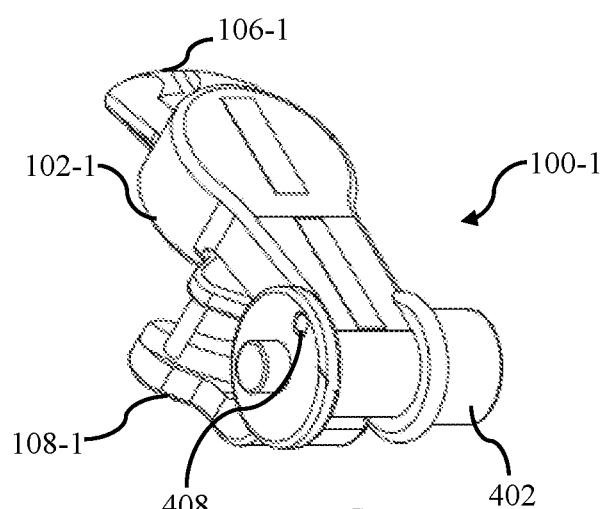
FIG. 4D illustrates a perspective view of a rotator means coupled with the coupler body in accordance with some embodiments of the present invention.

FIG. 4D illustrates a perspective view of a rotator means coupled with the coupler body in accordance with some embodiment of the present invention. Referring to FIGS. 4C and 4D, the locking mechanism 200-1 is configured to project the moveable pin or protrusion 204 into an opening (e.g., a through hole as shown in FIG. 4D) 408 formed in the rotator 402 (and, in some examples, through a corresponding through-hole/opening in the mounting bracket 110-1). When the locking mechanism 200-1 is engaged/activated, the moveable pin 204 extends into the opening 408 (as shown in FIG. 4C), thus locking the swinging-type locking gladhand 100-1 in a closed state (as shown in FIGS. 4A-4C) and preventing a user from swiveling/rotating the swinging-type locking gladhand 100-1 to an open position that would allow mating with another gladhand coupler carried on the tractor. When the locking mechanisms 200-1 is disengaged/deactivated or in unlock mode/state, the moveable pin 204 retreats/retracts into the closure housing 202, thus unlocking the swinging-type locking gladhand 100-1 and allowing the swinging gladhand 100-1 to be rotated to an open position, so that another gladhand coupler can be mated with the swinging-type locking gladhand 100-1.

Further, in case the swinging-type locking gladhand 100-1 is not connected to pneumatic line, it folds back into the sealed position against the stopper arm 118, which prevent contaminants from entering the air system and to prevent accidental breaking of the gladhand. In order to connect the pneumatic line to the gladhands, the operator must rotate the gladhands into the open position away from stopper arm 118.

In the various embodiments of the present invention, the locking mechanism 200-1 may be a wired locking mechanism or a wireless locking mechanism (as described above).

Figure 5A:
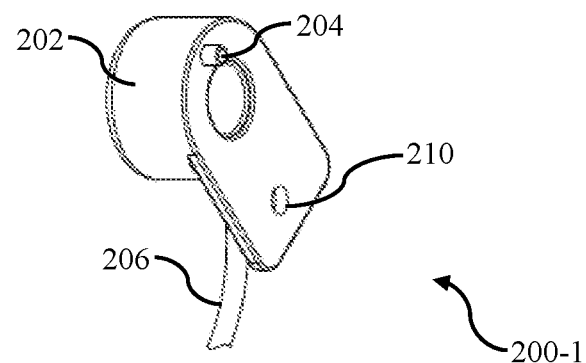
FIGS. 5A and 5B illustrate perspective view of a locking mechanism of the swinging-type locking gladhand in an unlocked position and locked position, respectively, in accordance with some embodiments of the present invention.
Figure 5B:
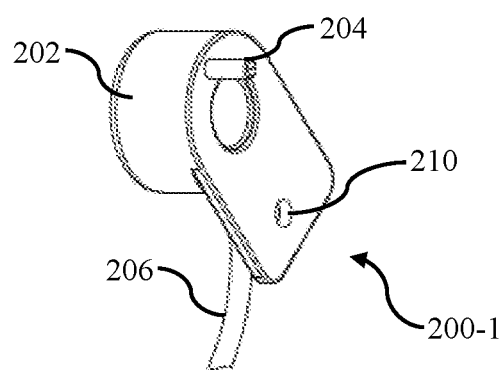

FIG. 5A and 5B illustrate perspective view of a locking mechanism of the swinging-type locking gladhand in an unlocked position and locked position, respectively, in accordance with some embodiments of the present invention. Referring to FIG. 5A, the locking mechanism 200-1 comprises a closed housing 202 enclosing various electrical and mechanical components for providing actuation to movable pin 204, a wired connection 206 to receive electrical power and/or signal and a hole 210 adapted to receive a secure means (like screw, bolt etc.) for firmly attaching the locking mechanism with the body of the swinging-type locking gladhand 100-1. In the unlocking state of the swinging-type locking gladhand 100-1, the movable pin 204 may retract/retreat into the closed housing 202 of the locking mechanism 200-1 (as shown in FIG. 5A) in order to unlock the swinging-type locking gladhand 100-1 and allowing the swinging gladhand 100-1 to be rotated to an open position, so that another gladhand coupler can be mated with the swinging-type locking gladhand 100-1. Once the coupler 102 of swinging-type locking gladhand 100-1 mated with the other gladhand coupler carried on tractor, pressurized air can flow through the swinging-type locking gladhand 100-1 to the pneumatic brakes, thus releasing/disengaging the brakes of towed asset and enabling it to be towed. The locking mechanism 200-1 may actuate the movable pin 204 by manually or automatically.

FIG. 5B illustrates the swinging-type locking gladhand 100-1 in a locked position in accordance with some exemplary embodiments of the present invention. In the locking state of swinging-type locking gladhand 100-1, the moveable pin 204 extends into the opening 408 (as shown in FIG. 4C), thus locking the swinging-type locking gladhand 100-1 in a closed state (as shown in FIGS. 4A-4C) and preventing a user from swiveling/rotating the swinging-type locking gladhand 100-1 to an open position that would allow mating with another gladhand coupler carried on the tractor.

In the preferred embodiment of the present invention, the locking mechanism 200-1 may provide the actuation to the movable pin 204 by means of an electronic circuitry, wherein a motor facilitates the movable pin 204 to extend out of, or retract/retreat into, the closed housing 202 of the locking mechanism 200 in order to lock or unlock the swinging-type locking gladhand 100-1. The closed housing 202 may enclose a movable pin 204, a sensor to detect the position of the gladhand i.e. whether it is closed or open, a motor that facilitates the movable locking pin 204 to lock or unlock the gladhand coupler, an electronic circuit that provides the defined motion to the motor, a processing unit that can receive commands to lock or unlock the gladhands by engaging or disengaging the movable pin 204, a wireless communication system to facilitate the swinging-type locking gladhand 100-1 to lock/unlock remotely by receiving and transmitting the signals from/to the fleet operator.

The locking mechanism 200-1 of the present invention is not limited to swinging-type locking gladhand; the locking mechanism 200-1 may be adapted to angled gladhand, straight gladhand, fixed gladhand and the like.

Figure 6A:
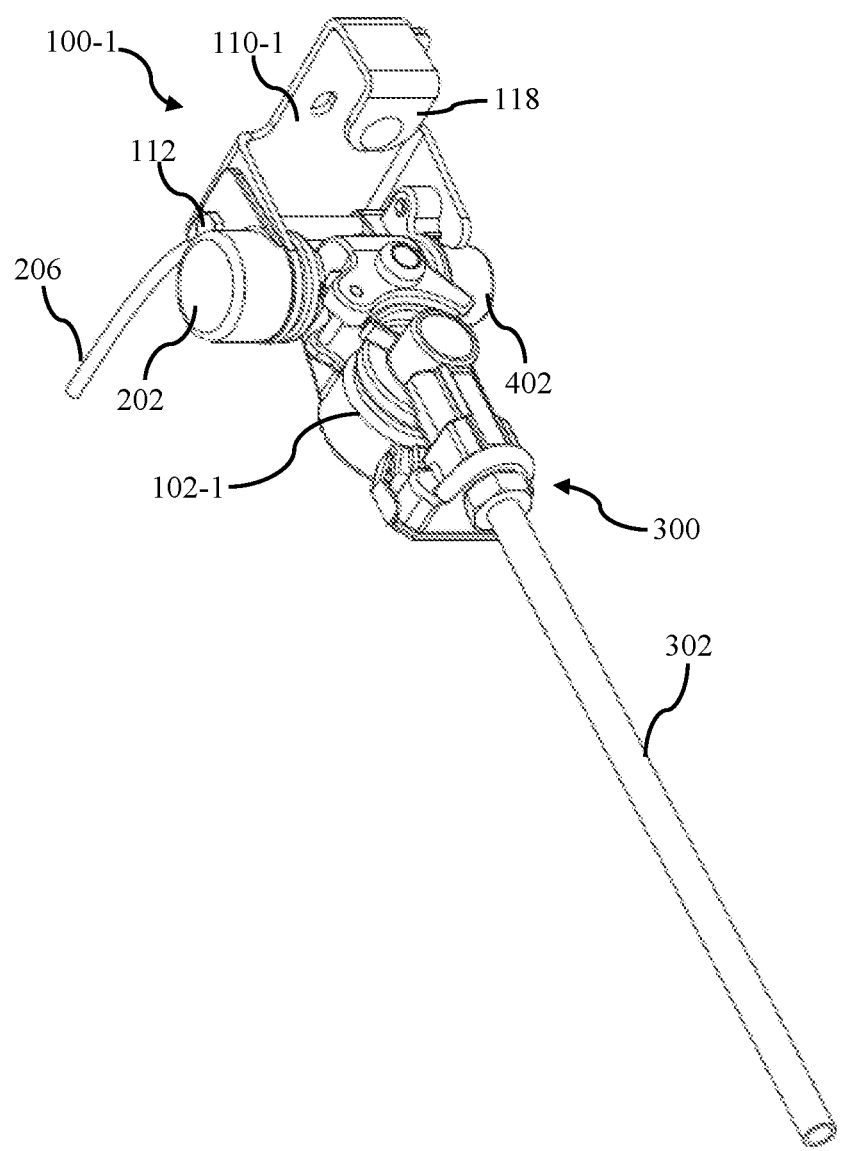
FIGS. 6A and 6B illustrate different views of the swinging-type locking gladhand when in an unlocked state/mode and mated with another gladhand connector carried on a tractor in accordance with an exemplary embodiment of the present invention.
Figure 6B:
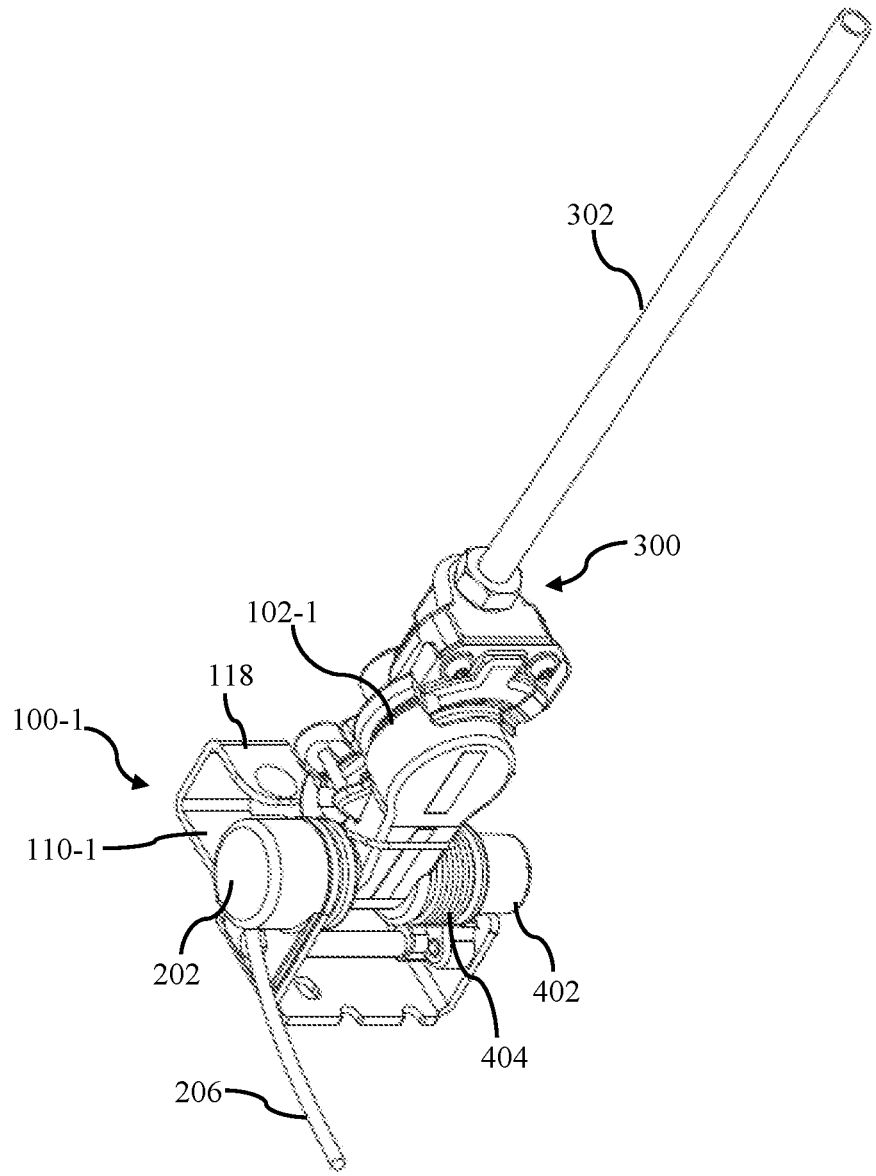

FIGS. 6A and 6B illustrate different views of the swinging-type locking gladhand 100-1 when in an unlocked state/mode and mated with another gladhand connector 300 carried on a tractor in accordance with an exemplary embodiment of the present invention. Referring to FIG. 6A-6B, the gladhand connector 300 provides a connection of pneumatic line 302 of tractor to the swinging-type locking gladhand 100-1, so as to provide pressurized air to operate the braking system of the towed asset.

Figure 7:
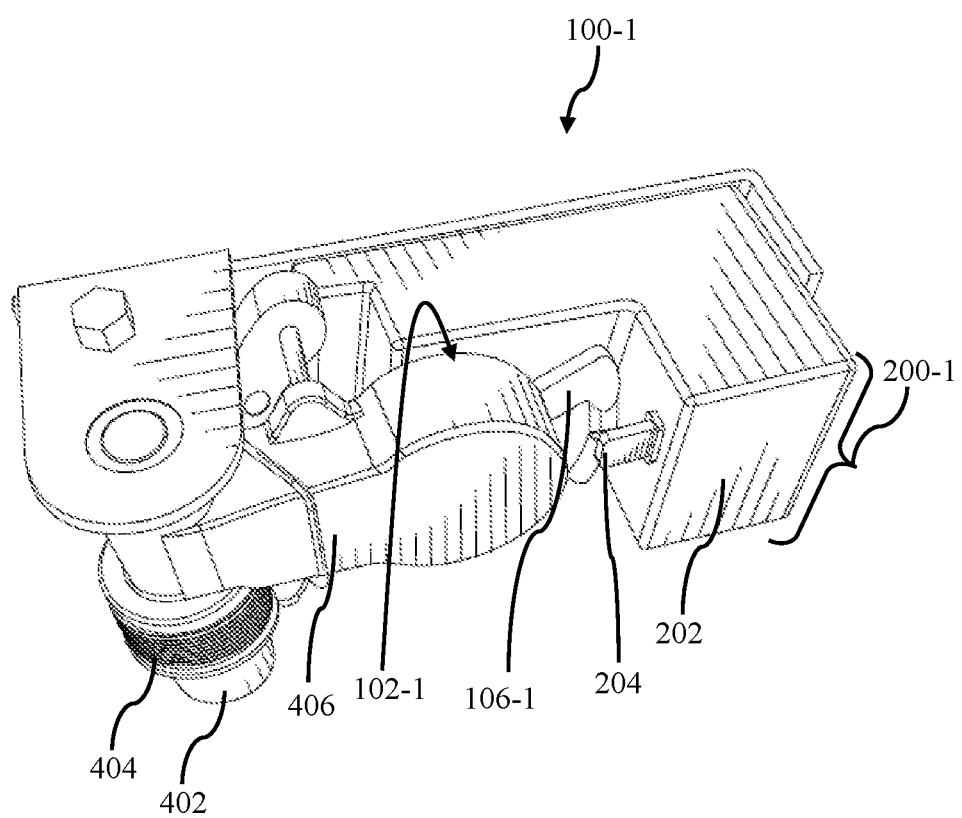
FIG. 7 illustrates a locking device with locking pin moveable in horizontal direction in accordance with some embodiments of present invention.

FIG. 7 illustrates a locking device with a locking pin moveable in a horizontal direction in accordance with some embodiments of present invention. The locking mechanism is positioned at the upper part of the gladhand 100-1. The swinging-type locking gladhand 100-1 comprises a coupler 102-1 for mating with the other coupler (or gladhand coupler) carried on a tractor for communication of pressurized air to release/engage the brakes of the trailer for movement thereof, an arcuate flange 106-1 with inter-lockable groove, a locking mechanism 200-1 configured to allow/prevent the swinging-type locking gladhand 100-1 being mated/abutted with other coupler (or gladhand coupler) carried on a tractor, a rotator means 402 for swinging the coupler 102-1 outwardly to accept the mating gladhand coupler carried on tractor, a spring mechanism 404 for automatically retracting the gladhand coupler 102-1 to move to its prior and/or locked position and a coupler body 406 rotatably coupled to the gladhand coupler 102-1 via a rotator means 402 at an axis of rotation. The locking mechanism 200-1 of the swinging-type locking gladhand as shown in FIG. 7 comprises a housing 202 for enclosing different electrical and mechanical components that force the movable pin 204 to extend or retract/retreat based on the command received through controller. The spring mechanism 404 of the swinging-type locking gladhand 100-1 is biased to a closed position in which the coupler body 406 comes into contact with, or within close proximity to a stopper portion as shown in FIG. 7. Rotating the coupler body 406 away from the stopper portion to an open position may involve a certain amount of exertion to overcome the spring-loaded bias.

When the gladhand coupler 102-1 comes into the rest position or within close proximity to a stopper portion, the fleet operator may command the locking mechanism 200-1 to lock the coupler. After receiving the command, the locking mechanism 200-1 facilitates the movable pin 204 to extent outward in horizontal direction to cover the arcuate flange 106-1 in order to prevent the unauthorized mating of coupler 102-1 with the other coupler carried on tractor. The fleet operator may give the command to the locking mechanism 200-1 to lock and/or unlock the gladhand coupler 102-1 by means of wired or wireless communication.

Figure 8A:
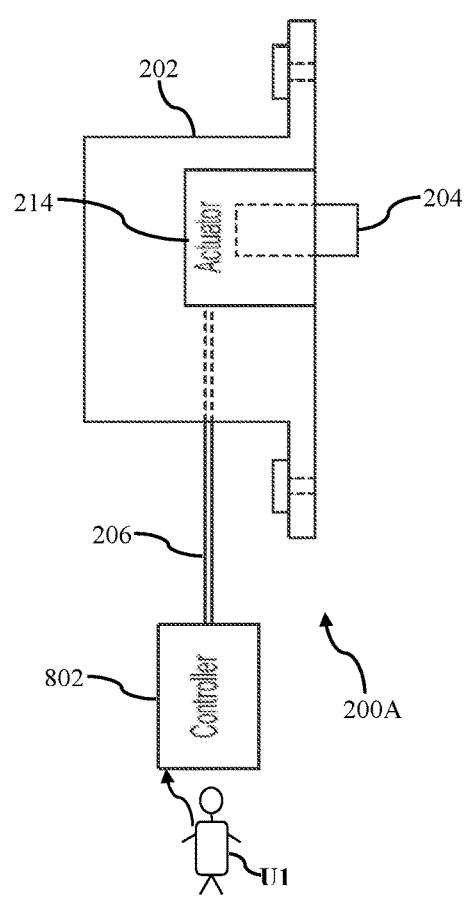
FIGS. 8A and 8B respectively illustrate a wired locking device and a wireless locking device, according to some embodiments of the present invention.
Figure 8B:
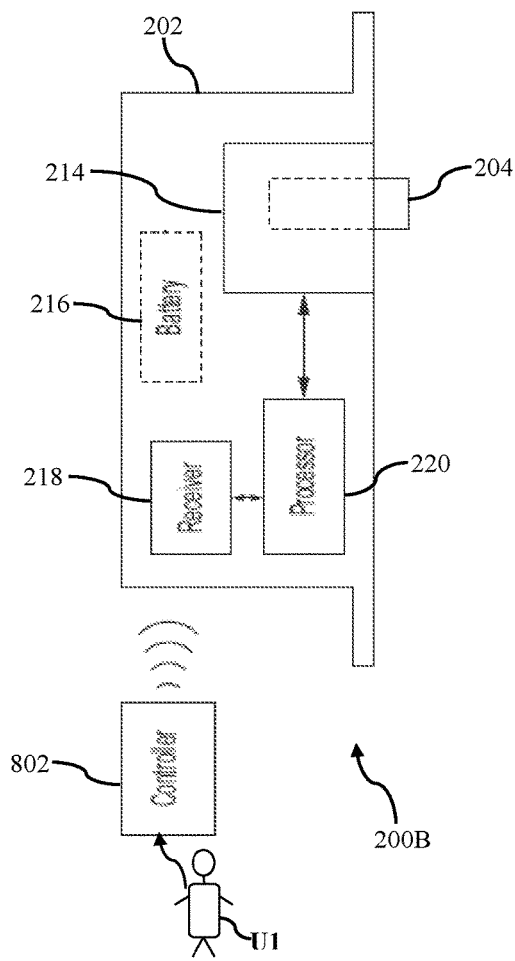

FIGS. 8A and 8B respectively illustrate a wired locking device and a wireless locking device, according to some embodiments of the present invention. The locking mechanism 200 or 200-1 of the gladhands may be operated by providing a wired connection as shown in FIG. 8A or wirelessly from a remote location as shown in FIG. 8B. Referring to FIG. 8A, it shows a wired connected locking mechanism 200A, according to some embodiments of the present invention. In FIG. 8A, the wired locking mechanism 200A comprises a closed housing 202 enclosing an actuator means 214 that activates (i.e., enters a locked state) or deactivates (i.e., enters an unlocked state) in response to a control signal received, via a wired connection 206, from a controller 802 (e.g., a master controller or a gateway device) that controls various operations of the electrical system of the trailer/chassis. The locking mechanism 200 may also receive electrical power through a power line of the wired connection 206, which may receive power from the electrical system of the tractor or a battery/generator at the trailer/chassis. The operator U1 may control the locking and unlocking function of the locking mechanism 200A. The operator U1 may be a fleet operator or fleet owner or fleet manager or fleet driver, and the like. According to some examples, the actuator means 214, which converts electrical energy into mechanical pushing/pulling force or motion, may be a stepper motor or a solenoid actuator, a piezo actuator, or the like. The actuator means 214 may be in a default locked state or a default unlocked state. That is, in the absence of a control signal (or applied electrical power), the actuator means 214 may maintain the moveable pin 204 in an outwardly extended (i.e. for locking mode) or inwardly retracted position (i.e. for unlocking mode). The controller 802 is, but not limited to, a desktop, a laptop, a wired connected Smartphone, and the like.

In another aspect of the present invention, the locking mechanism may be operated wirelessly from a remote location as shown in FIG. 8B. Referring to FIG. 8B, the wirelessly operated locking mechanism 200B comprises a closure housing 202 for enclosing different electrical and mechanical components, a receiver 218 for receiving commands from remotely located operator U1, a processor 220 for executing and processing the received commands, a battery 216 to supply power to various electronics and electronics components, an actuator means 214 that extends or retracts/retreats the movable pin 204. Further, the wirelessly operated locking mechanism 200B may comprises a sensor to detect the position of the gladhand coupler 102 or 102-1 i.e. whether it is closed or open position/mode. The actuator means 214 facilitates the movable pin 204 to lock or unlock the gladhand coupler, a wireless communication system to facilitate the locking mechanism 200B to operate remotely by receiving and transmitting the signals from/to the operator U1. Preferably, the actuator means 214, which converts electrical energy into mechanical pushing/pulling force or motion, may be a stepper motor or a solenoid actuator, a piezo actuator, or the like. The operator may be a fleet operator or fleet owner or fleet manager or driver, and the like. The operator 802 is, but not limited to, a remote control, a desktop, a tablet, a Smartphone, a laptop, application installed Smartphone and the like with internet connectivity.

The remotely or wirelessly operated locking mechanism 200B of the gladhand connector 100 or 100-1 is designed to remotely lock or unlock the locking pin 204 so as to prevent the unauthorized connection of a tractor airline to the gladhand on the towed asset.

The processor 220 of wirelessly operated locking mechanism 200B may be connected to or integrated with a short-range-wireless transceiver, such as a Bluetooth transceiver, for the purpose of receiving commands to lock and unlock the gladhands and transmitting the status of the gladhands to a nearby internet-connected gateway, or to a user device with radio connectivity or internet connectivity, such as a laptop, tablet, or phone.

The processor 220 may be connected to or integrated with an internet-connected gateway, for the purpose of receiving commands to lock and unlock the gladhand and transmitting the status of the gladhand to a remote cloud server.

The status of the gladhand that is transmitted to a remote cloud server, or a nearby laptop, tablet, or phone, can include whether the gladhand is locked or unlocked, whether the gladhand has received an authorized or unauthorized command to lock or unlock, whether the gladhand is in the home position or rotated away from the home position, and the time when the status last changed.

In order to validate that a lock or unlock command is coming from an authorized source, the microcontroller may have a digital memory that can store digital certificates for the purpose of verifying encrypted digital signatures, such as for example using the X.509 public key certificate standard. The microcontroller may reject commands that arrive without either the appropriate digital signature, a unique identifier designating each individual gladhand, or a timestamp within a valid range.

The owner of the private key corresponding to the digital signature may sign sub-certificates on behalf of an owner/operator that grant the owner/operator the ability to generate their own digital signatures for some predefined subscription period (e.g. 1 month or 1 quarter). In this case, a fleet owner would be required to periodically regenerate their sub-certificates for each gladhand, and the owner of the private key may charge a fee for this service.

The receiver 218 or wireless communication system of the present invention may employ any suitable wireless protocol, such as Bluetooth, Radio frequency, or cellular communication to transmit and receive commands from processor 220.

The movable pin 204 may be placed at an angle to the coupler body of the gladhand, such that if the coupler body of gladhand is not completely rotated into the home position (i.e. engaging the stopper arm 118), the motion of the pin 204 in the locking direction may help to nudge the gladhands into the home position.

Preferably, the locking pin should not be placed into an extended or locking position when the gladhand coupler is not in the home position. If the processor 220 receives a command to lock the gladhand coupler while the gladhand is not in the home position, the processor may abandon the command or defer the command until such time as the gladhand coupler is returned to the home position. A sensor is required to detect whether the gladhand coupler is in fact in the home position. The swinging-type locking gladhand 100-1 may contain a magnet that allows a magnetic sensor attached to the processor 220 to detect when the gladhand coupler is rotated into the home position. An infra-red or other optical sensor attached to the processor may detect when the gladhand coupler is rotated into the home position.

A button or other mechanical actuator may close or open an electrical circuit attached to the processor when the gladhand is returned to the home position. An electrical contact that is made between the gladhand coupler and a circuit attached to the processor 220 may cause an electrical signal to be detected by the processor 220 when the gladhand coupler is returned to the home position.

The movable pin may have the ability to extend far enough to make contact with the hole (disposed on the coupler body as shown in FIG. 4D) when it is in the home position. In this case, the motor will stall when the locking pin makes contact. The stall condition may be detected by the processor 220, for example by means of a position encoder on the motor, or else by measuring the motor current. When the processor directs the motor to lock the gladhand, it may first attempt to extend the pin far enough so as to make contact with the gladhand. The presence or absence of a motor stall can indicate to the processor 220 whether or not the gladhand is returned to the home position.

In other embodiments a remote server can be provided in which both the processor and the server communicate with the owner/operator of the towed asset. In the foregoing description, it will be readily appreciated by those skilled in the art that modifications may be made to the invention without departing from the concepts disclosed herein. Such modifications are to be considered as included in the following claims, unless these claims by their language expressly state otherwise.

Figure 9:
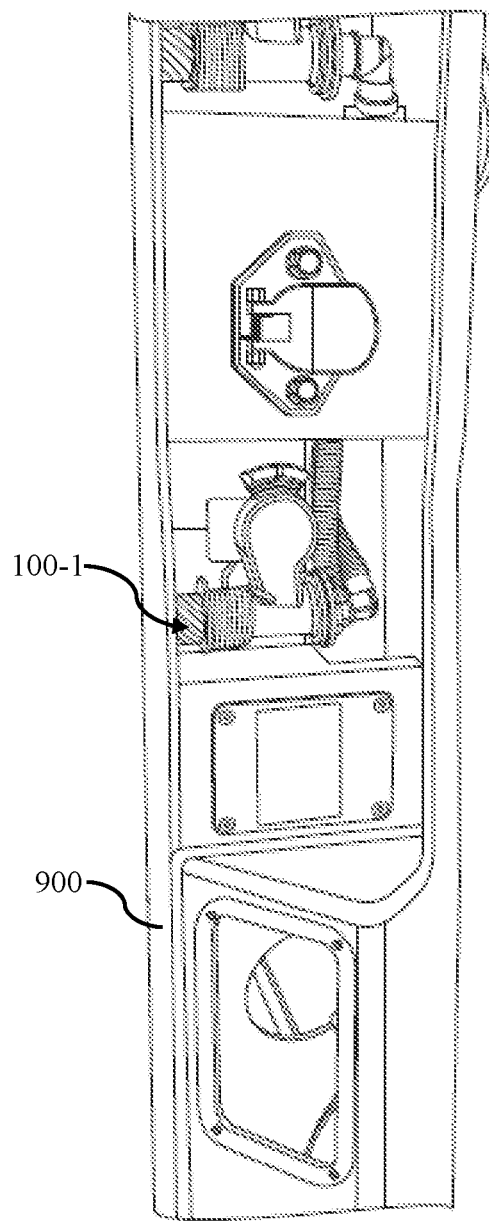
FIG. 9 shows the swinging-type locking gladhand mounted onto a chassis/trailer.

FIG. 9 shows the swinging-type locking gladhand 100-1 mounted onto (e.g., embedded in) the chassis/trailer 900. However, embodiments of the present invention are not limited thereto, and the locking gladhand 100/100-1 may be mounted to any suitable unit.

It should be understood that the foregoing relates only to illustrative embodiments of the invention, and that numerous changes may be made therein without departing from the scope and spirit of the invention as defined by the following claims.

We claim:

1. A locking gladhand device comprising:
   a mounting bracket including a stopping portion;
   a rotatable body rotatably coupled to the mounting bracket at an axis of rotation;
   a locking device housing attached to the mounting bracket, the locking device housing including a locking pin connected to an actuator;
   a spring element coupled to the mounting bracket and the rotatable body and configured to bias the rotatable body toward the stopper portion of the mounting bracket; and
   a microcontroller configured to signal the actuator to extend the locking pin from an unlocked position in which the locking pin is retracted within the housing into a locking position in which the locking pin extends from the housing to engage the rotatable body to prevent the rotatable body from rotating at the axis of rotation while the locking pin is in the locking position.

2. The locking gladhand device of claim 1, wherein the actuator is a solenoid or a step motor.

3. The locking gladhand device of claim 1, wherein the locking pin is configured to move in a horizontal direction or in a vertical direction to lock the rotatable body.

4. The locking gladhand device of claim 1, wherein the mounting bracket is fixedly coupled to surface of a trailer or a chassis or a flatbed.

5. The locking gladhand device of claim 1, wherein the locking device housing further comprises:
   a battery;
   a receiver configured to receive a wireless control signal from a mobile device or a remote server; and
   a processor configured to control the locking device into the locked state or the unlocked state based on the wireless control signal.

6. The locking gladhand device of claim 1, wherein the microcontroller comprises a memory configured to store a digital certificate for verifying encrypted signature.

7. The locking device of claim 6, wherein the microcontroller is configured to reject a signal with an unmatched digital certificate.

\* \* \* \* \*